US008000957B2

(12) United States Patent
Deshpande et al.

(10) Patent No.: US 8,000,957 B2
(45) Date of Patent: Aug. 16, 2011

(54) ENGLISH-LANGUAGE TRANSLATION OF EXACT INTERPRETATIONS OF KEYWORD QUERIES

(75) Inventors: Prasad M. Deshpande, Sunnyvale, CA (US); Rajasekar Krishnamurthy, Mountain View, CA (US); Sriram Raghavan, San Jose, CA (US); Shivakumar Vaithyanathan, Sunnyvale, CA (US); Huaiyu Zhu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 12/129,082

(22) Filed: May 29, 2008

(65) Prior Publication Data

US 2008/0228468 A1    Sep. 18, 2008

Related U.S. Application Data

(63) Continuation of application No. 11/615,115, filed on Dec. 22, 2006.

(51) Int. Cl.
*G06F 17/28* (2006.01)
*G06F 17/27* (2006.01)
*G06F 7/00* (2006.01)
*G06F 17/30* (2006.01)

(52) U.S. Cl. .............. 704/9; 704/4; 704/7; 707/602; 707/779

(58) Field of Classification Search ............ 704/4, 8, 704/9
See application file for complete search history.

(56) References Cited

U.S. PATENT DOCUMENTS

| 5,239,617 | A  | * | 8/1993  | Gardner et al.    | 706/11  |
|-----------|----|---|---------|-------------------|---------|
| 5,519,608 | A  | * | 5/1996  | Kupiec            | 704/9   |
| 5,715,468 | A  | * | 2/1998  | Budzinski         | 704/9   |
| 5,857,179 | A  | * | 1/1999  | Vaithyanathan et al. | 1/1  |
| 5,909,678 | A  | * | 6/1999  | Bergman et al.    | 1/1     |
| 5,960,384 | A  | * | 9/1999  | Brash             | 704/9   |
| 6,076,088 | A  |   | 6/2000  | Paik et al.       |         |
| 6,349,276 | B1 |   | 2/2002  | McCarley          |         |
| 6,363,301 | B1 | * | 3/2002  | Tackett et al.    | 700/246 |
| 6,584,464 | B1 |   | 6/2003  | Warthen           |         |
| 6,701,294 | B1 |   | 3/2004  | Ball et al.       |         |
| 6,842,730 | B1 | * | 1/2005  | Ejerhed et al.    | 704/9   |
| 7,539,660 | B2 | * | 5/2009  | Focazio et al.    | 1/1     |
| 2003/0069880 | A1 | * | 4/2003 | Harrison et al. | 707/3   |
| 2003/0078766 | A1 | * | 4/2003 | Appelt et al.   | 704/9   |
| 2004/0172237 | A1 | * | 9/2004 | Saldanha et al. | 704/4   |
| 2005/0267871 | A1 | * | 12/2005| Marchisio et al.| 707/3   |

* cited by examiner

*Primary Examiner* — Richemond Dorvil
*Assistant Examiner* — Olujimi A Adesanya
(74) *Attorney, Agent, or Firm* — Cantor Colburn LLP; Brian Lambert

(57) ABSTRACT

The present invention relates to a methodology to translate exact interpretations of keyword queries into meaningful and grammatically correct plain-language queries in order to convey the meaning of these interpretations to the initiator of the search. The method includes the steps of generating at least one grammatically valid plain-language sentence interpretation for a keyword query from a generated sentence plain-language sentence clauses, wherein the grammatically valid plain-language sentence is based upon differing matching elements, and presenting at least one grammatically valid plain-language sentence interpretation for the keyword query to a keyword query system user for the user's review.

16 Claims, 3 Drawing Sheets

USUS 8,000,957 B2

ENGLISH-LANGUAGE TRANSLATION OF EXACT INTERPRETATIONS OF KEYWORD QUERIES

CROSS REFERENCE TO RELATED APPLICATIONS

This application is a continuation of U.S. patent application Ser. No. 11/615,115 filed Dec. 22, 2006, the contents of which are incorporated by reference herein in their entirety.

BACKGROUND OF THE INVENTION

1. Field of the Invention

This invention relates to field of information retrieval techniques, in particular to the English language translation of exact interpretations of keyword queries.

2. Description of Background

Before our invention keyword searching was the most important paradigm for Information Retrieval (IR). Conventionally, an Avatar Semantic Search was accomplished by generating precise queries from a keyword query that was based upon a domain-specific system type. For a given keyword query, several possible interpretations of the keyword query may be produced within a search. Semantic optimizers using semantic knowledge and heuristics operate to prune keyword query interpretations, wherein the remaining keyword query interpretations are utilized to assist in the keyword search. In structure, keyword query interpretations are X-Path expressions, thus displaying the keyword query interpretations directly to a user is of little value since the interpretations cannot be easily understood and reviewed by the user. Therefore, there exists a need for an approach for displaying plain-language interpretations of X-Path expressions for review to the initiator of an Avatar Semantic Search.

SUMMARY OF THE INVENTION

Aspects of the present invention relate to a methodology for the translation of exact interpretations of keyword queries into meaningful and grammatically correct plain-language queries in order to convey the meaning of these interpretations to the initiator of the keyword search.

The shortcomings of the prior art are overcome and additional advantages are provided through the provision of a method for translating an interpretation of a keyword query into a grammatically correct plain-language query, the method comprising the steps of acquiring at least one keyword to perform a keyword query search upon, semantically interpreting the acquired keyword, further including the step of building a translation index to determine matching elements, wherein matching elements are derived from information comprising type names, attribute names, and atomic attributes values that are associated with a specific keyword.

The method further comprises the steps of merging the matching elements in the event that differing keywords comprise the same matching element and type alias, providing a clause template for the customization of a plain-language sentence clause, wherein the plain-language sentence clause is based upon the matching elements that are selected for customization, and generating at least one plain-language sentence clause, and determining if the plain-language sentence clauses can be merged, wherein the determination is based upon the matches on the attribute paths for a given type element. Further, the method comprises the steps of specifying the plain-language sentence clauses that are to be merged, the plain-language sentence clause mergers being based on the attribute paths for a given matching type element, and merging the plain-language sentence clauses. Further, the method comprises a language for specifying custom templates for generating clauses and sentences.

Yet further, the method comprises the steps of generating at least one grammatically valid plain-language sentence interpretation for the keyword query from the generated sentence plain-language sentence clauses, wherein the grammatically valid plain-language sentence is based upon differing matching elements, and presenting at least one grammatically valid plain-language sentence interpretation for the keyword query to a keyword query system user for the user's review.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution that assists in the translation of interpretations of keyword queries into meaningful and grammatically correct plain-language queries, the meaning of these interpretations thereafter being displayed to the initiator of the search.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Document collections often have valuable structured information that is associated with each document that is present within the collection. Traditional information retrieval (IR) models used in keyword searching employ text-centric representations of queries and documents (e.g., term vectors, bag of index terms, etc.). As a result, such IR models are incapable of effectively utilizing structured metadata as part of keyword retrieval operations. To address the mismatch between the need for a simple keyword-based search interface, and the need for complex queries to exploit structured data, Avatar Semantic Search operations employ the concept of query interpretation. In particular, Avatar Semantic Searching enumerates several possible interpretations of a keyword query and expresses each interpretation as a complex query over the underlying collection of queries.

Conventionally, query interpretation is the process of generating a set of precise queries over a data set, one for each possible interpretation of a given keyword query. An interpretation for a keyword assigns specific semantics for the particular keyword. By assigning specific semantics to each keyword in the query, very precise interpretations for the query are subsequently produced. Thus, given a keyword query, a system generates a set of interpretations for that query.

Figure 1:
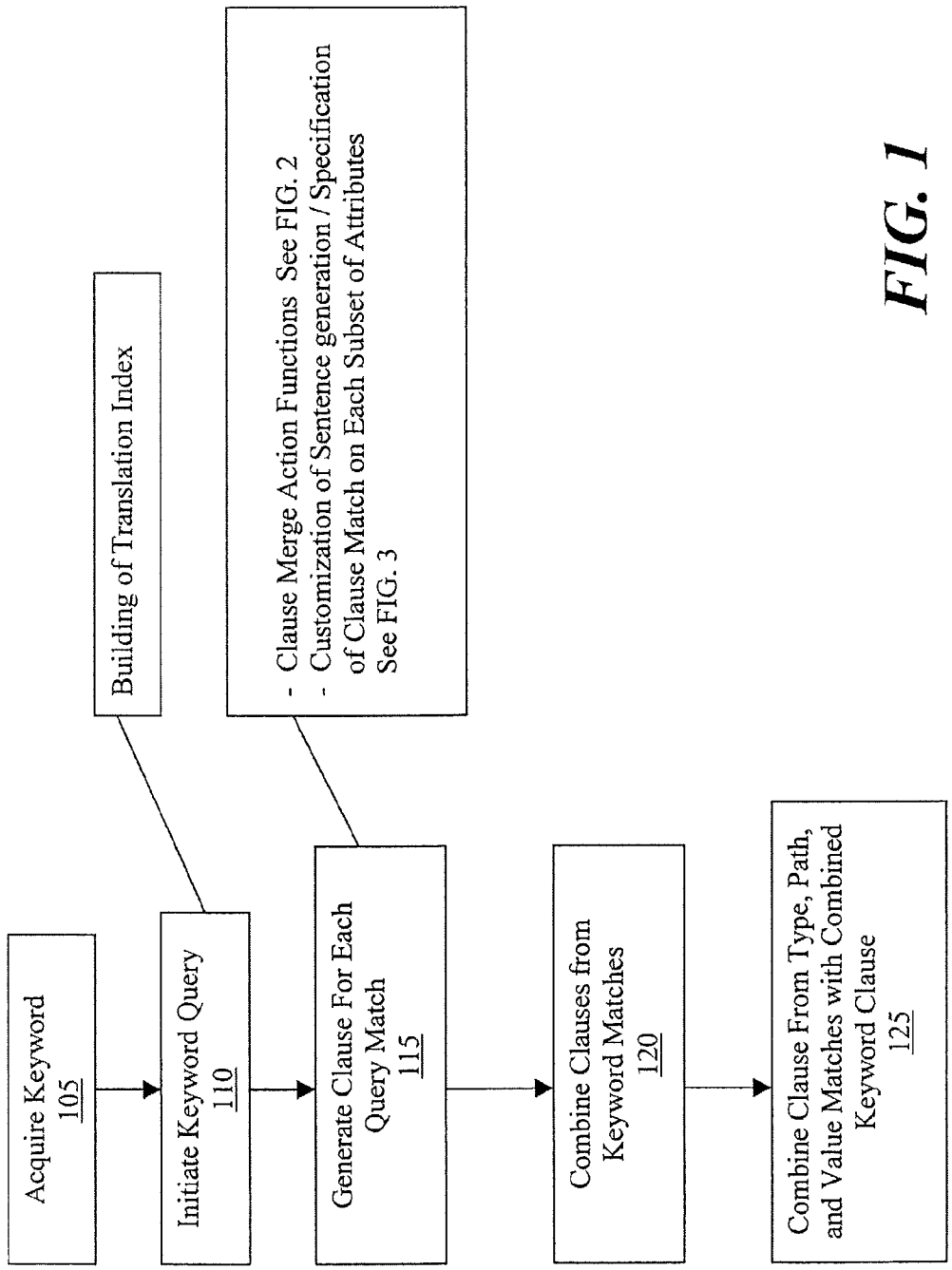
FIG. 1 illustrates one example of a flow diagram illustrating aspects of the methodology that relates to the present invention.

Turning now to the drawings in greater detail, FIG. 1 shows a flow diagram detailing aspects of the present keyword translation methodology. The method comprises the steps of the party that is desirous of the keyword search supplying the keyword(s) that will form the basis of the search (step 105). At step 110, the keyword search is initiated, and at step 115, a clause is generated for each keyword match that occurs within the query. Next, at step 120, the clauses generated for word matches that have occurred within the search are combined into a single clause. Lastly, at step 125, the clauses from the type match, path match, and value match occurrences in the search are combined with the keyword match clause to form a plain-language interpretation of the keyword query search.

As an example, let us consider a keyword search over a body of email documents. Given the task of looking for the telephone number of an individual named Philip by locating an email message in which the number is mentioned, a natural user query would be 'Philip telephone'. In the absence of any structured data, a traditional IR engine would return documents that contain the tokens 'Philip' and 'telephone' (ignoring synonym expansion, stemming, etc.). Now assume that in addition to the actual text, each document is automatically associated with four structured attributes corresponding to the email headers: from, date, to, and subject. Additionally, consider that the following text analysis engines (TAES) are executed over the entire corpus of the email:
1. Entity recognition engines to extract names of persons and organizations.
2. Pattern recognition engines to extract telephone numbers and URLs.
3. Signature identifier to process email signatures and extract persons, companies, websites, numbers, etc. from the text of the signature.

In order to figure out possible interpretations for any keyword, the system builds a translation index. The translation index is a keyword-matching engine built over the set of all type names (e.g., Email, Person, Telephone, . . . ), attribute names (firstname, number, . . . ), and atomic attribute values (Philip, pdf, 408, . . . ). This index allows us to restrict the potential space of semantic interpretations for each keyword. Given a keyword, the translation index returns a set of one or more matching elements (types, paths, or values) from the semantic catalog. Within aspects of the present invention, type matches are based on type names, path matches are based on attribute names, and value matches are based on the atomic attribute values. For instance, given the keyword 'telephone', the translation index may return a type match [type Telephone], and a path match [path Signature. phone]. Similarly, given the keyword Philip, the translation index may return one or more of the following value matches: [val Person. name], [val signature.person. name], [val Email. from], and [val Email. to]. Notice how the type and path matches are dependent only on the type system, while the value matches are actually dependent on the data.

During the Query interpretation stage, each token in the query is probed against the translation index to enumerate all possible semantic interpretations. In our case, this step results in:

Philip =>
(1) [val Email. from]
(2) [val Signature.person.name]
(3) [val Email .to]
(4) [word Email. body]
Telephone =>
(1) [type Telephone]
(2) [path signature. phone]
(3) [word Email. body]

The fact that a token can be simply treated as a keyword is reflected by the match [word Email. body] on the original document text. Queries are generated by taking all of the possible combinations of matches for each keyword. Some sample queries are given below. The query labels below are designed to reflect the interpretations used for each keyword.
q1;1 retrieve emails from Philip containing a telephone number
q2;2 retrieve emails containing Philip's signature with a telephone number
q3;1 retrieve emails sent to Philip containing a telephone number
q1;3 retrieve emails from Philip containing the keyword Telephone Each of these query label interpretations correspond to a precise query over the data set. These precise queries are evaluated, and the results of the evaluation are presented to the user. Each interpretation of a query represents the particular semantics for that query. It is very useful to display to the user the semantics that the system is using, so that the user can see the co-relation between the results and the particular interpretation. One way to display the semantics is to show the precise query corresponding to the interpretation to the user. However, the precise query is expressed in the Avatar query language, and this language may prove to be difficult for the user to understand without first having an understanding of the Avatar object model and query language. An alternative approach to informing the user of the relationship between the results and an interpretation is to generate an English language equivalent for the query interpretation, and display the English language equivalent to the user. Such an interpretation will be easy for any user to understand, and the user can also straightforwardly compare the different interpretations, selecting the interpretation that accurately captures what they intended for the query. For example, see the English language interpretations of the query 'Philip telephone' as listed above.

The problem that this invention solves can be described as follows:
1. Given a set of keywords and their semantic interpretations, generate a grammatically valid English sentence to represent the interpretation.
2. The sentence generation should be easily customizable so that specific clauses can be generated for different types and matches.

Generating Clauses:

The present invention provides solutions for generating a clause for each match, and combines these clauses into a meaningful sentence. There are four types of possible matches:

1. Type match (type k T)—this indicates that the keyword k matches the name of a type T in the system. For example, the keyword 'Telephone' generates a type match (type 'Telephone', Telephone)
2. Path match (path k T.a.b)—this indicates that a keyword k matches the name of an attribute path 'a.b' for type T. Since the type system is hierarchical, attributes can be other types. We use a dot notation to denote a chain of attributes. For example the keyword 'Telephone' generates a path match (path 'Telephone' Signature. phone)
3. Value match (value k T.a.b)—this indicates that a keyword k matches one of the values taken by an attribute path 'a.b' for type T in the body. For example, the keyword 'Philip' generates a value match (value 'Philip' signature.person.name) since there is an instance of Signature in the body that has a person with name 'Philip'.
4. Word match (word k)—this indicates that k be treated simply as a keyword to match against the document. For example, the keyword 'Philip' generates a word match (word 'Philip')

For each kind of match, we have a default clause that gets generated:
1. Type match (type k T): the clause generated is either 'a T' or 'an T' depending on the first letter of T. For example, (type 'Telephone' Telephone) generates 'a Telephone'.
2. Path match (path K T.a.b.c): the clause generated is 'a/an T having a/an a with a/an b with a/an c'. For example, (path 'Telephone' Signature. phone) generates the clause 'a Signature having a phone'.
3. Value match (value k T.a.b.c): the clause generated is 'a/an T having a/an a with a/an b with a/an c containing k'. For example, (value 'Philip' signature.person.name) generates the clause "a Signature having a person with a name containing 'Philip'".
4. Word match (word k): the clause generated is 'k'. For example, (word 'Philip') generates the clause "'Philip'"

Combining the Clauses

The clauses generated from the matches are put together in a sentence. With aspects of the present invention, the construction of a valid sentence from clauses is based upon the grammatical rules for the English language; however, the present methodology can be adapted to conform to the grammatical rules of languages other than English. In the present implementation, since the sentence is of a very specific form, we can construct it in a more direct manner.

Let Ck1, Ck2 . . . Ckm be the clauses from the word matches. First, these clauses are put together into a single clause Ck='the keyword/s Ck1, Ck2 . . . Ckm'. For example, if there are two word clauses 'Philip' and 'Telephone', the combined clause Ck is "the keywords 'Philip' and 'Telephone'".

Let C1, C2 . . . Cn be the clauses generated from type, path, value matches, and the combined word clause. The final sentence will be of the form: "Retrieve documents that contain C1, C2 . . . Cn". For example, consider an interpretation of the keyword query 'Philip telephone' that includes the matches (path 'Telephone' Signature. phone) and (word 'Philip'). The clauses generated are 'a Signature having a phone' and "the keyword 'Philip'". Putting these together, we get the final sentence: "Retrieve documents that contain a signature having a phone and the keyword 'Philip'".

Handling Type Merge

Figure 2:
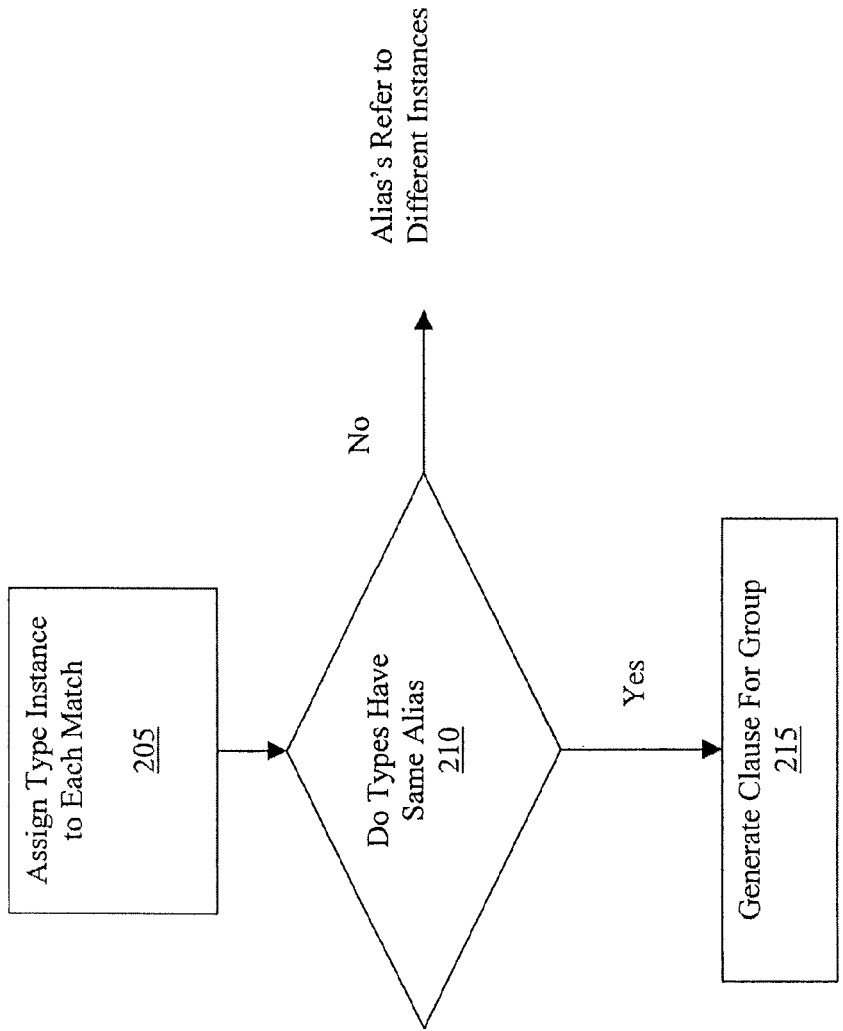
FIG. 2 illustrates one example of a flow diagram detailing aspects of a clause merge operation.

In some interpretations, the different keywords might match the same type. For example, (value 'Philip' signature.person.name) and (path 'Telephone' Signature. phone) refer to the same type signature. In this event there are two possibilities: either the two matches might refer to different signature instances, or they refer to the same signature instance. The semantics of the two choices are different. In one case, we are looking for emails that contain a signature having a person with name 'Philip', and a signature (may be same or different) having a phone number. In the single instance case, we are looking for emails that contain a signature having a person with name 'Philip' and a phone number. The process of having different matches for a type refer to the same instance is called type merging (See FIG. 2). These two choices are considered as separate interpretations and are generated by the system using type merge. As shown at step 205, an initial determination is made to assign a type instance to each match.

The information about the type instance for any match is also stored in an interpretation using a type alias. If the alias for two matches is the same, they refer to the same instance (step 210). Adding type alias to our notation, the two choices are:
1. (value 'Philip' Signature.person.name s1), (path 'Telephone' Signature. phone s2) where the matches refer to different instances of Signature s1 and s2.
2. (value 'Philip' Signature.person.name s1), (path 'Telephone' Signature. phone s1) where the matches refer to the same instance of Signature s1.

To generate an appropriate English representation for an interpretation with type merge, we first group matches by their type alias. For example,
1. If the matches are (value 'Philip' Signature.person.name s1), (path 'Telephone' Signature. Phone s2), we have two groups: s1: {(value 'Philip' Signature.person.name s1)} and s2: {(path 'Telephone' Signature. phone s2)}.
2. If the matches are (value 'Philip' Signature. person. name s1), (path 'Telephone' Signature. phone s1) we have a single group s1: {(value 'Philip' signature.person.name s1), (path 'Telephone' Signature. phone s1)}.

Type merge affects the way clauses are generated for matches. Type merge is not applicable for a type match, since the system automatically prunes multiple type matches to the same type. Type merge is also not applicable for a word match, since word matching is for the document content and not any particular type instance. Let us now revisit the clause generation for path and value matches. Type merge implies a clause merge on the generated English clause. Rather than generating a clause for each match, we generate a clause for each group when matches are grouped by the type alias (step 215). The clause for a group has the type mentioned once and has a sub clause for each different match in the group, consider these examples:
1. Only Path Matches
   After grouping by type aliasing, consider a group that contains
   t1: {(path K1 T.a.b.c t1), (path K2 T.e.f t1)}
   The clause generated is 'a/an T having a/an a with a/an b with a/an c and a/an e with a/an f'.
   For example, the clause for the interpretation with the group s1: {(path 'Philip' Signature.person.name s1), (path 'Telephone' Signature. phone s1)} will be 'a Signature having a person with a name and a phone.'
2. Only Value Matches
   The different value matches might refer to the same path or different paths on the type. To handle these cases, we do a further grouping by the path used in the value matches. A>different paths
   t1: {(value K1 T.a.b.c t1), (value K2 T.e.f t1)}

The clause generated is 'a/an T having a/an a with a/an b with a/an c containing K1 and a/an e with a/an f containing K2'.

B>common path a.b.c t1: {(value K1 T.a.b.c t1), (value K2 T.a.b.c t1)}

The clause generated is 'a/an T having a/an a with a/an b with a/an c containing K1 and K2'.

For example, the clause for the interpretation with the group s1: {(value 'Philip' Signature.person.name s1), (value 'Thomas' Signature.person.name s1)} will be "a Signature having a person with a name containing 'Philip' and 'Thomas'"

3. Both Path and Value Matches

We combine the steps described in 1 and 2. Consider a group that contains:

t1: {(path K1 T.a.b.c t1), (value K2 T.e.f t1) (value K3 T.e.f t1)}

The clause generated is 'a/an T having a/an a with a/an b with a/an c and a/an e with a/an f containing K2 and K3'.

For example, the clause for the interpretation with the group s1: {(value 'Philip' Signature.person.name s1), (path 'Telephone' Signature. phone s1)} will be "Signature having a phone and a person with a name containing 'Philip'".

Customizing the Sentence Generation

The algorithm presented until now treats all types uniformly, and generates clauses for them based on type and attribute names. However, very often users want to customize the plain-language English sentence that is generated. The sentence is more readable if customized clauses are generated for certain types and their matches. For example, rather than saying:

"Signature having a person with a name containing 'Philip'", one can say "Philip's Signature".

Figure 3:
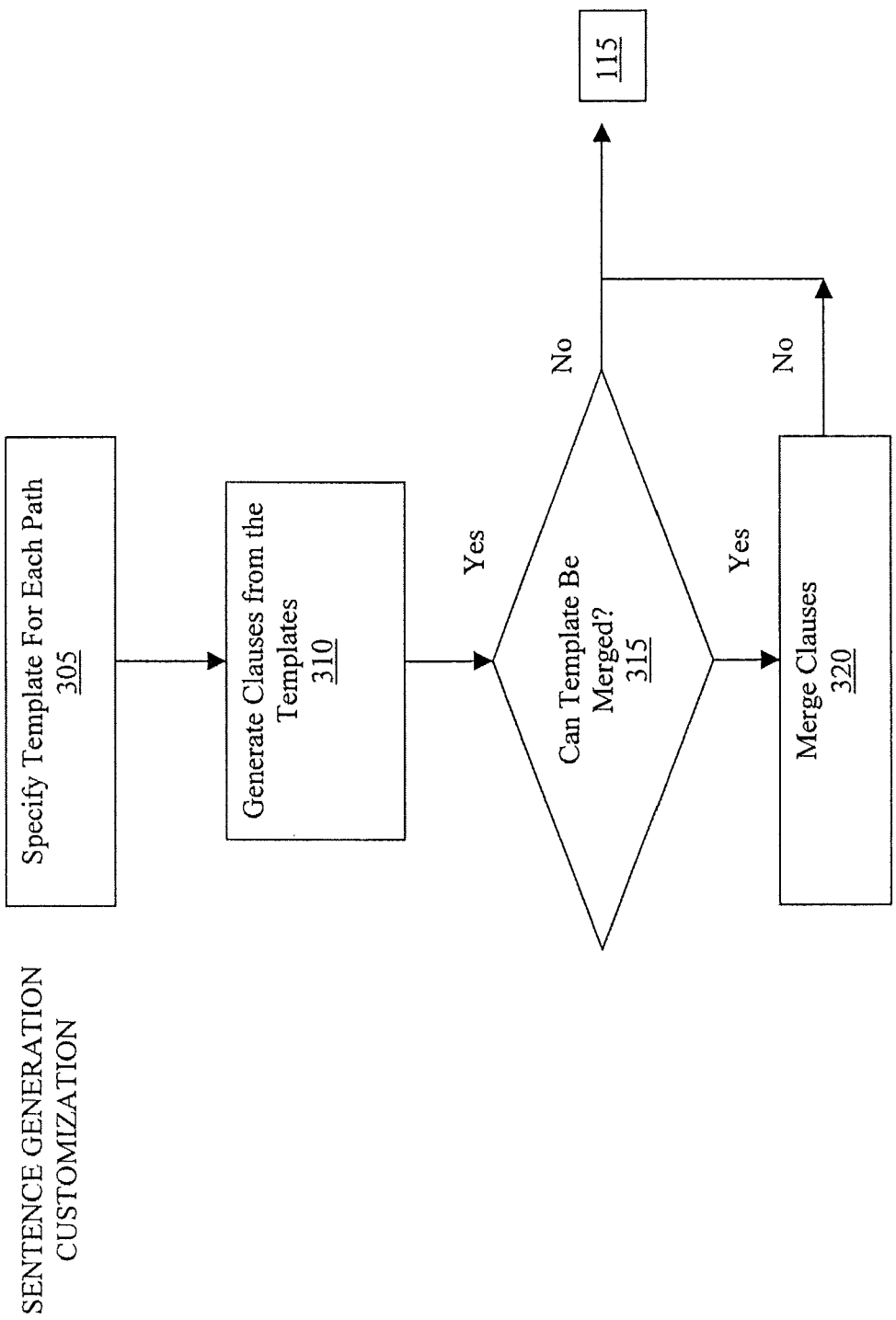
FIG. 3 illustrates one example of a flow diagram detailing aspects of a sentence generation customization operation.

We have defined a template-based algorithm for allowing these customizations (See FIG. 3). At step 305, the user can provide a clause template for the types and matches that she wants to customize. At step 310, the custom clauses are generated from these templates. A design issue to consider is the level of sentence customization that can be allowed. For example, a given type T can have multiple attributes (and consequently attribute paths). Due to type merge, we may have multiple paths matching for the same type instance. To be very general, we will need to be able to specify a clause for matches on each subset of attributes for a type. Consider the type Signature that has the attributes person.name and phone. In the instance of the match (value 'Philip' signature.person.name s1), we want to generate the clause "Philip's Signature", and for the match (path 'Telephone' Signature. phone s2), we want to generate the clause "signature having a phone number".

In the event that the two types are merged, the ideal clause to be generated is "Philip's Signature having his phone number". There is no obvious way to generate this from the two individual clauses specified by the user. The user has to specify this merged clause explicitly to be used in case there is a match on both person.name and phone for a given instance of signature. Specifying a clause for each subset of attributes leads to an exponential blowup in the number of clause templates that can be specified. As a tradeoff, users are allowed to specify templates for each path separately and also determine if these templates can be merged. If merging is allowed (step 315), our algorithm will merge the clauses automatically (step 320). The details of templates and algorithms utilized within aspects of the invention are explained below.

Template Specification:

A template is a string that comprises embedded processing instructions and placeholders. The placeholders and instructions are specified within the characters "<<" and ">>". Templates are arranged hierarchically, and further a template is provided for an overall sentence. Within aspects of the present invention templates have placeholders for clauses, wherein each clause is generated using a template. A clause can have sub-clauses depending on the match type. An example of a simple sentence template is "Retrieve all emails <<CLAUSE0>><<CLAUSE1>>". This template has two placeholders <<CLAUSE0>> and <<CLAUSE1>>. The constructs allowed in templates are describe below:

<<CLAUSEX>>: This is a placeholder for a clause of type X. Clauses can be of different types that are numbered as 0, 1 . . . n. A clause of type X will be inserted at the location of <<CLAUSEX>>. Having clauses of different types enables us to enforce positional constraints on where difference clauses occur in the final sentence.

<<TRIPLE: s1:s2:s3>>: This is a processing instruction and provides a mechanism for generating different strings depending on the position of the clause. For example, let T be a template that has the instruction <<TRIPLE: s1:s2:s3>>, and E be the enclosing template, i.e. T generates a clause that is inserted into E. The semantics of these templates are represented as:

a> If T is the first clause to be inserted into E, then the TRIPLE generates s1 in T b> If T is the last but not the first clause to be inserted in E, then the triple generates s3 in T c> If T is neither the first nor the last clause to be inserted in E, then the triple generates s2 in T For example, let the template for type match on Signature be T1="<<TRIPLE: that contain:,: and>> a signature". The template for type match on Phone is T2="<<TRIPLE: that contain:,: and>> a phone number". T1 and T2 are clauses of type 0. The enclosing template is the sentence template E="Retrieve all emails<<CLAUSE0>>". If the interpretation has two type matches, first on Signature and the second on Phone, then applying the semantics of TRIPLE, the first clause generated is "that contain a signature" and the second clause is "and a phone number". Substituting these in the enclosing template E, we get "Retrieve all emails that contain a signature and a phone number'. The TRIPLE allows us to generate "that contain" in one case and "and" in the other case depending on where the clause will be placed in the sentence.

| | |
|---|---|
| <<K>> | This is a placeholder for a value in a word match. |
| <<V>> | This is a placeholder for a value in a value match. |
| <<SET: Var>> | This sets a Boolean variable called Var to true. |
| <<CHKRST: Var: sl>> | This checks the status of the variable Var. If Var is set, the string sl is generated in the clause and Var is reset to false. Otherwise, nothing is generated and this instruction has no effect. |

SET and CHKRST give more fine grain control over strings to generate and might be useful in cases where TRIPLE is not sufficient. This template specification language is powerful enough to handle a great assortment of linguistic cases.

Next we will describe what templates need to be specified for the different cases:

1. Sentence template: This is the overall template of the sentence. This will have placeholders for <<CLAUSEX>> to indicate where the clauses of different types are to be inserted.

Example:
Sentence Template="Retrieve all emails <<CLAUSE0>><<CLAUSE1>>"
2. Type match template: For each type, we specify:
   a> a template that generates the clause for a match on that type. This clause will be substituted into the sentence template.
   b> the type of the clause generated.

We will refer to these templates as Type Match Templates. Example: for type 'Telephone':
Type Match template="<<TRIPLE: that contain:,: and>> a phone number" type=1

3. Path and Value matches: Path and value matches are affected by type merges. So the templates for them are comprised of multiple parts that allow generation of merged clauses.
   I> First for each type, we specify:
   a> a template that generates the type part of the clause for a path or value match.
   b> the type of the clause generated.

We will refer to these templates as Path/Value Match Type Templates. Example: for type 'signature':

---
Path/Value Match Type template = "<<TRIPLE: that contain:,: and>><<CLAUSE0>>signature<<CLAUSE1>>"
type = 1
---

II> For each path, for both value and path matches we specify:
   a> a template that generates a sub-clause that gets inserted into the type template.
   b> the type of the clause generated.
   c> mergeable flag—indicates if this clause can be merged with other clauses as a result of type merge. For some custom clause, this merging might not make sense, so this flag is set to false. Note that if this flag is false, the clause template should typically contain the type part as well, since it is not obtained by merging with the Path/Value Match Type Template.

We will refer to these templates as Path/Value Match Path Templates. Example: for type 'Signature' and path 'person. name':

---
Value Match Path template = "<<CLAUSE>>'s "
type = 0
mergeable = true
---

Example: for type 'Signature' and path 'phone':

---
Path Match Path template = "<<TRIPLE: having:,: and>> a phone number"
type = 1
mergeable = true
---

III> For each path, we also specify a value match template that is applicable for value matches
   a> a template that generates the value clause to be inserted into the path clause generated by the Path Match template.

We will refer to these templates as Value Match Value templates. Example: for type 'Signature' and path 'person. Name':
Value Match Value template=<<TRIPLE:: ,: and>><<V>>

4. Word matches: we specify
   a> a template to generate the keyword clause that will be inserted into the sentence template.
   b> the type of the clause generated.

We refer to this template as Word Match template. Example: a keyword template could be, ---
Word Match template = <<TRIPLE: that contain:,: and>><<K>>
type = 1
---

Consider an interpretation that has the matches:

---
(value 'Philip' Signature.person.name sl)
(path 'Telephone' Signature. phone sl)
---

Note that the types have been merged.
a> the Value Match Value template for signature.person.name is "<<TRIPLE:: ,: and>><<V>>" For the value 'Philip' this resolves to, "Philip". The TRIPLE generates an empty string since this is the first value in the enclosing template.
b> the Value Match Path template for value match of Signature.person.name is "<<CLAUSE>>'s" with type=0 and mergeable=true. Substituting the value clause, this resolves to "Philip's". This is a clause of type 0.
c> the Path Match Path template for path match on Signature. phone is "<<TRIPLE: having: ,: and>>a phone number" with type=1 and mergeable=true. Since this is the first clause of type 1, this resolves to "having a phone number". This is a clause of type 1.
d> the Path/Value Match Type template for path and value matches for Signature is "<<TRIPLE: that contain:,: and>><<CLAUSE0>>Signature<<CLAUSE1>>" with type=1. Substituting the clauses generated in steps b and c in their appropriate places and resolving the TRIPLE, we get "that contain Philip's signature having a phone number". We could do this since clauses generated in b and c are both mergeable. This is a clause of type 1.
e> finally, substituting this into the sentence template "Retrieve all emails<<CLAUSE0>><<CLAUSE1>>", we get the final sentence "Retrieve all emails that contain Philip's signature having a phone number".

Thus the template based sentence generation methodologies of the present invention allow for the straightforward customization of generated English sentences. If customization for a type or path is not needed, then the user doesn't have to specify the type or path. In these cases, the system will automatically use default templates that will generate sentences as described initially. In the signature example, with default templates the system will generate:
"Retrieve documents that contain a signature having a person with name containing 'Philip' and a phone"

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for translating an interpretation of a keyword query into a grammatically correct plain-language query statement in a computer system having a processor, the method comprising the steps of:
  acquiring, by the processor, at least one keyword to perform a keyword query search upon;
  semantically interpreting, by the processor, the acquired keyword, further including the step of building a translation index to determine matching elements, wherein matching elements are derived from information comprising type names, attribute names, and atomic attributes values that are associated with a specific keyword;
  merging, by the processor, the matching elements in the event that differing keywords comprise a same matching element and type alias;
  providing, by the processor, a clause template for the customization of a plain-language sentence clause, wherein the plain-language sentence clause is based upon the matching elements that are selected for customization;
  generating, by the processor, at least one plain-language sentence clause for each of the matching elements, wherein the matching elements relate to matches including a type match, a path patch, a value match and a word match;
  determining, by the processor, if the plain-language sentence clauses can be merged, wherein the determination is based upon the attributes matched for a given type element;
  specifying, by the processor, the plain-language sentence clauses that are to be merged, the plain-language sentence clause mergers being based upon the attributes matched for a given type element;
  merging, by the processor, the plain-language sentence clauses, wherein the merging occurs for at least one of the path match, the value match and a combination of the path match and the value match, and wherein the merging is not possible for the type match and the word match;
  generating, by the processor, at least one grammatically valid plain-language sentence for the keyword query from the generated plain-language sentence clauses, wherein the grammatically valid plain-language sentence is based upon differing matching elements;
  presenting, by the processor, the at least one grammatically valid plain-language sentence for the keyword query to a keyword query system user for the user's review.

2. The method of claim 1, wherein the matching elements comprises elements that are related to a type match, a path match, a value match, and a word match.

3. The method of claim 2, further comprising the step of associating, by the processor, a differing default plain-language sentence clause with each matching element.

4. The method of claim 1, wherein the generated grammatically valid plain-language sentence is based on grammatical rules associated with the English language.

5. The method of claim 1, wherein multiple word matching elements are combined into a plain-language sentence clause.

6. The method of claim 1, wherein the matching elements having the same type alias are grouped together, and their plain-language sentence clauses are merged.

7. The method of claim 1, further comprising the step of providing, by the processor, a template for the overall structure of the at least one grammatically valid plain-language sentence.

8. The method of claim 7, wherein the template comprises at least one placeholder for the information that is contained within a plain-language sentence clause.

9. The method of claim 7, wherein the templates are hierarchical in structure, the templates being configured to generate clauses, and sub-clauses that are comprised within the clauses, the clauses and sub-clauses of the template being used to construct plain-language sentences.

10. The method of claim 7, wherein the plain-language sentence clauses are classified as consecutively numbered types.

11. A computer program product that includes a non-transitory computer readable medium useable by a processor, the medium having stored thereon a sequence of instructions which, when executed by the processor, causes the processor to translate an interpretation of a keyword query into a grammatically correct plain-language query, wherein the computer program product executes the steps of:
  acquiring at least one keyword to perform a keyword query search upon;
  generating a keyword query in order to semantically interpret the acquired keyword, further including the step of building a translation index to determine matching elements, wherein matching elements are derived from information comprising type names, attribute names, and atomic attributes values that are associated with a specific keyword;
  merging the matching elements in the event that differing keywords comprise a same matching element and type alias;
  providing a clause template for the customization of a plain-language sentence clause, wherein the plain-language sentence clause is based upon the matching elements that are selected for customization;
  generating at least one plain-language sentence clause for each of the matching elements, wherein the matching elements relate to matches including a type match, a path patch, a value match and a word match;

determining if the plain-language sentence clauses can be merged, wherein the determination is based upon the attributes matched for a given type element;

specifying the plain-language sentence clauses that are to be merged, the plain-language sentence clause mergers being based upon the attributes matched for a given matching element;

merging the plain-language sentence clauses, wherein the merging occurs for at least one of the path match, the value match and a combination of the path match and the value match, and wherein the merging is not possible for the type match and the word match;

generating at least one grammatically valid plain-language sentence interpretation for the keyword query from the generated plain-language sentence clauses, wherein the grammatically valid plain-language sentence is based upon differing matching elements;

presenting the at least one grammatically valid plain-language sentence interpretation for the keyword query to a keyword query system user for the user's review.

12. The computer program product of claim 11, further comprising the step of providing a template for the overall structure of the at least one grammatically valid plain-language sentence.

13. The computer program product of claim 12, wherein the template comprises at least one placeholder for the information that is contained within a plain-language sentence clause.

14. The computer program product of claim 12, wherein the templates are hierarchical in structure, the templates being configured to generate clauses, and sub-clauses that are comprised within the clauses, the clauses and sub-clauses of the template being used to construct plain-language sentences.

15. The computer program product of claim 12, wherein the plain-language sentence clauses are classified as consecutively numbered types.

16. The computer program product of claim 12, wherein the plain-language sentence templates can be optionally labeled as having the capability of being merged, in the event that the plain-language sentence templates are labeled as having the capability to be merged, then the clauses that correspond to the plain-language sentence templates are thereafter merged.

* * * * *